(12) United States Patent
Thebault et al.

(10) Patent No.: US 10,525,936 B2
(45) Date of Patent: Jan. 7, 2020

(54) WINDSCREEN WIPER FOR A SYSTEM FOR WIPING A WINDOW OF A VEHICLE AND ASSEMBLY METHOD THEREOF

(71) Applicant: Valeo Systèmes d'Essuyage, Le Mesnil Saint Denis (FR)

(72) Inventors: Denis Thebault, Clermont Ferrand (FR); Philippe Carraro, St-Amant-Tallende (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 649 days.

(21) Appl. No.: 14/571,630

(22) Filed: Dec. 16, 2014

(65) Prior Publication Data

US 2015/0166013 A1    Jun. 18, 2015

(30) Foreign Application Priority Data

Dec. 16, 2013    (FR) ..................... 13 62711

(51) Int. Cl.
*B60S 1/04* (2006.01)
*B60S 1/38* (2006.01)

(52) U.S. Cl.
CPC .......... *B60S 1/0408* (2013.01); *B60S 1/3805* (2013.01); *B60S 1/3808* (2013.01); *B60S 1/3877* (2013.01); *B60S 1/381* (2013.01); *B60S 1/3881* (2013.01); *B60S 2001/3898* (2013.01); *Y10T 29/49826* (2015.01)

(58) Field of Classification Search
CPC ...... B60S 1/0408; B60S 1/3808; B60S 1/381; B60S 1/3805; B60S 1/3877; B60S 1/3881
USPC ....................... 15/250.04, 250.201
See application file for complete search history.

(56) References Cited

U.S. PATENT DOCUMENTS

2004/0111820 A1*  6/2004  Aoyama ............... B60S 1/381
                                                   15/250.201
2006/0179597 A1*  8/2006  Hoshino ............... B60S 1/38
                                                   15/250.43

(Continued)

FOREIGN PATENT DOCUMENTS

CN        1764565 A       4/2006
CN      201124819 Y      10/2008

(Continued)

OTHER PUBLICATIONS

First Office Action in corresponding Chinese application No. 201410784290.3, dated Feb. 14, 2018 (15 pages).

*Primary Examiner* — Andrew A Horton
(74) *Attorney, Agent, or Firm* — Osha Liang LLP

(57) ABSTRACT

The invention relates to a windscreen wiper for a system for wiping a window of a vehicle, in particular a motor vehicle, comprising:
  a wiper blade (16),
  a strip-shaped, resilient, elongated support element (18),
  a longitudinal retaining member (30) for the blade (16) which comprises a first longitudinal housing (32) for receiving a heel (34) of the blade (16) and a second longitudinal housing (42) for receiving said support element (18), and
  a longitudinal body (14) which forms an aerodynamic deflector (20) and which comprises means for hooking onto the retaining member (30),
characterized in that the longitudinal body (14) is fixed in a non-detachable manner to the retaining member (30).

15 Claims, 2 Drawing Sheets

(56) References Cited

U.S. PATENT DOCUMENTS

2011/0185531 A1* 8/2011 Egner-Walter .......... B60S 1/381
    15/250.01
2013/0269142 A1* 10/2013 Egner-Walter ............ B60S 1/38
    15/250.32

FOREIGN PATENT DOCUMENTS

CN     103402834 A     11/2013
EP     2 415 645 A1     2/2012

* cited by examiner

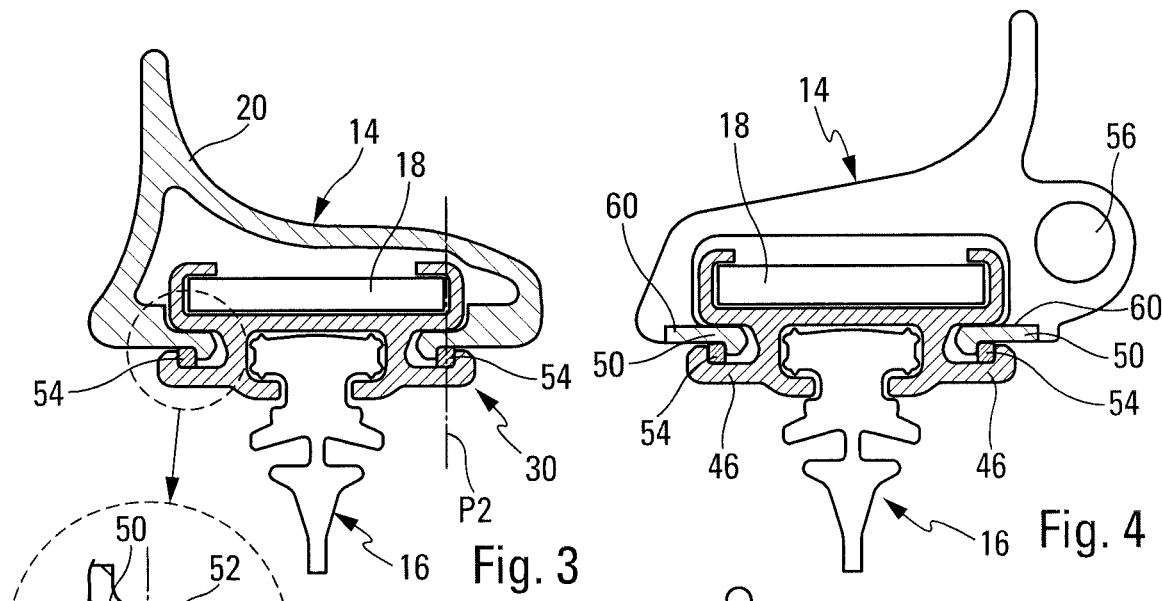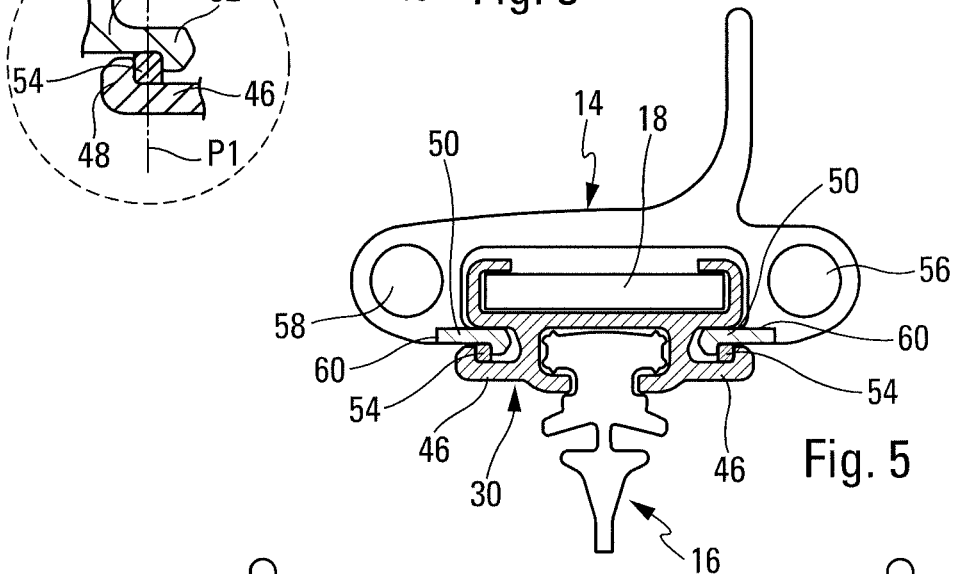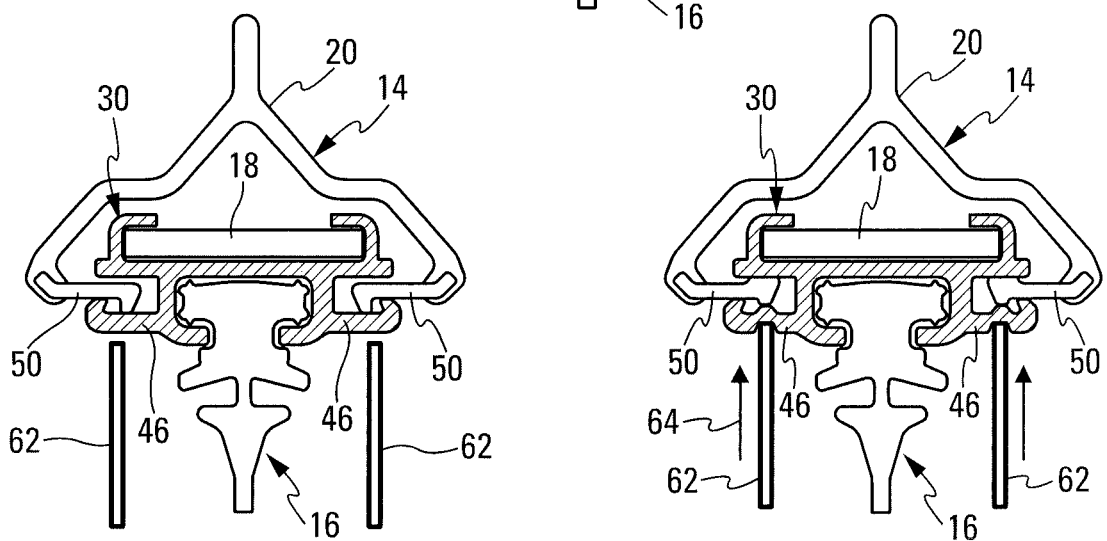

WINDSCREEN WIPER FOR A SYSTEM FOR WIPING A WINDOW OF A VEHICLE AND ASSEMBLY METHOD THEREOF

TECHNICAL FIELD

The present invention relates to a windscreen wiper for a system for wiping a window of a vehicle, in particular a motor vehicle, a system for wiping a window of a vehicle, in addition to an assembly method for a windscreen wiper of a vehicle.

PRIOR ART

Typically, a windscreen wiper for a system for wiping a window of a motor vehicle comprises a longitudinal body bearing a wiper blade, generally made of rubber, designed to scrape against the windscreen of the vehicle to remove water by driving it outside the field of vision of the driver. The wiper further comprises at least one strip-shaped, resilient, elongated support element, also called a stiffening member, which may provide a curvature to the wiper blade so as to promote the application of said blade onto the windscreen.

Certain windscreen wipers are provided with a retaining member for the blade to which is fixed a body bearing an aerodynamic deflector designed to improve the aerodynamic performances of the wiper and to ensure that it presses against the windscreen. The retaining member generally comprises a first housing for receiving a heel of the blade and a second housing for receiving the support element. The body comprises means for fixing to the retaining member and said aerodynamic deflector.

It has been observed that during use, the body of this type of wiper may be detached from the retaining member, in particular due to the forces exerted by the flow of air on the deflector of the body, when the vehicle travels at a relatively high speed.

The invention proposes a solution to this problem which is simple, efficient and economical.

SUMMARY OF THE INVENTION

The invention proposes a windscreen wiper for a system for wiping a window of a vehicle, in particular a motor vehicle, comprising:
  a wiper blade,
  a strip-shaped, resilient, elongated support element,
  a longitudinal retaining member for the blade which comprises a first longitudinal housing for receiving a heel of the blade and a second longitudinal housing for receiving said support element, and
  a longitudinal body which forms an aerodynamic deflector and which comprises means for hooking onto the retaining member,
characterized in that the longitudinal body is fixed in a non-detachable manner to the retaining member.

In the present application, "non-detachable fixing" is understood as a fixing which is not removable or a permanent fixing. Two elements fixed in a non-detachable manner may not be easily dismantled from one another. More specifically, two elements fixed in a non-detachable manner may not be separated from one another without damaging at least one of said elements. For example, in the case where one element is separated from another element to which it has been fixed in a non-detachable manner, this separation may cause the tearing of one of the elements. This damage may prevent reproducing the fixing of these elements in the original state of this fixing (before the separation of the elements). In the aforementioned example, even if these elements are fixed again to one another, they may not be exactly as they were originally due to the tearing of one of the elements.

As indicated above, it is conceivable to dispense with a non-detachable fixing between two elements (resulting in damage of the aforementioned type) if sufficient tractive force is applied to one of the elements relative to the other element. By means of a traction test, the tear strength of this fixing may be used to quantify this non-detachable fixing and is, for example, greater than or equal to 50N within the scope of the invention.

According to the invention, the longitudinal body is fixed in a non-detachable manner to the retaining member which enables the aforementioned problem of inadvertent detachment of the longitudinal body relative to the retaining member to be resolved. The support element is not affected by this non-detachable fixing in the sense that it is conceivable that it remains able to be dismantled relative to the retaining member and to the longitudinal body of the wiper.

The hooking means of the longitudinal body may be fixed in a non-detachable manner to complementary hooking means of the retaining member.

The longitudinal member may comprise two longitudinal hooks which are fixed in a non-detachable manner to the longitudinal hooks of the retaining member, respectively.

The longitudinal hooks of the longitudinal body may be substantially coplanar. The longitudinal hooks of the retaining member may be substantially coplanar.

Advantageously, the non-detachable fixing is implemented by at least one point or bead of solder or adhesive between the longitudinal body and the retaining member. The point or bead of solder may be a point or bead of solder produced by heating or ultrasound.

Each hook of the longitudinal body may be fixed to the corresponding hook of the retaining member by at least one point or bead of solder or adhesive.

The non-detachable fixing may thus be implemented with the addition of material (adhesive) or without the addition of material (solder). The welding may be implemented by heating (directly or by ultrasound) the materials of the longitudinal body and the retaining member, so that their materials are diffused into one another or are mixed with one another.

The retaining member and the longitudinal body are generally produced from plastics material. The welding may be implemented by heating their materials between 200 and 300° C., for example.

It is understood that in the case of adhesive bonding, the separation of the longitudinal body from the retaining member will cause damage to the longitudinal body or the retaining member, such as the tearing of at least one of these elements and/or residue of adhesive which is difficult to remove from at least one of said elements. In the case of welding which might result in the diffusion of the material of one of the elements into that of the other element, the separation of the longitudinal body from the retaining member will cause significant damage to the longitudinal body or the retaining member as a significant part of one of the elements risks being torn during the separation.

It is thus able to be easily identified if the longitudinal body and the retaining member of a wiper according to the invention are in their original fixing state or they have been separated from one another.

The wiper may comprise, at each of its longitudinal ends, a terminal end piece which is mounted on the end parts of the longitudinal body and the retaining member.

In the case where the blade of the wiper is worn and has to be removed from the remainder of the wiper for the purpose of its replacement, it is thus conceivable to remove the terminal end pieces of the wiper to be able to remove the blade. The non-detachable fixing of the longitudinal body to the retaining member thus does not interfere with this operation.

At least one point or bead of solder or adhesive may be located in the vicinity of each terminal end piece.

Said first and second housings of the retaining member may be configured to receive by longitudinal sliding the heel of the blade and the support element, respectively.

The support element may extend above the heel of the blade.

The wiper according to the invention may further comprise:
  at least one longitudinal heating element, and/or
  at least one internal conduit for circulating fluid, such as windscreen washer fluid.

The present invention also relates to a system for wiping a window of a vehicle, in particular a motor vehicle, comprising at least one wiper as described above.

The present invention further relates to an assembly method for a windscreen wiper for a system for wiping a window of a vehicle, in particular a motor vehicle, said wiper comprising:
  a wiper blade,
  a strip-shaped, resilient, elongated support element,
  a longitudinal retaining member for the blade which comprises a first longitudinal housing for receiving a heel of the blade and a second longitudinal housing for receiving said support element, and
  a longitudinal body which forms an aerodynamic deflector and which comprises means for hooking onto the retaining member,
  the method comprising the steps consisting of:
  a) inserting by sliding the heel of the blade and the support element respectively into the first and second housings of the retaining member, and
  b) hooking the longitudinal body onto the retaining member,
  characterized in that it comprises an additional step consisting of fixing in a non-detachable manner the longitudinal body to the retaining member, for example by adhesive bonding or welding.

DESCRIPTION OF THE FIGURES

The invention will be understood more clearly and further details, features and advantages of the invention will appear from reading the following description given by way of non-limiting example with reference to the accompanying drawings, in which:

FIGS. 3 to 5 are schematic sectional views of variants of the windscreen wiper according to the invention, and FIGS. 6 and 7 are schematic sectional views of the windscreen wiper of FIG. 3 and illustrate the steps of a method according to the invention for the assembly of said wiper.

DETAILED DESCRIPTION

It should be noted that the figures describe the invention in a detailed manner to implement the invention, said figures naturally being able to be used to define the invention more clearly if required.

In the following description the terms "longitudinal" or "lateral" refer to the orientation of the windscreen wiper according to the invention. The longitudinal direction corresponds to the principal axis of the wiper in which it extends, whilst the lateral orientations (respectively front and rear) correspond to concurrent straight lines, i.e. which intersect the longitudinal direction, in particular perpendicular to the longitudinal axis of the wiper in its rotational plane. For the longitudinal directions, the terms "external" or "internal" are interpreted relative to the fixing point of the wiper on the wiper carrier arm, the term "interior" corresponding to the part where the arm and a half-wiper extend. Finally, the directions referenced as "upper" or "lower" correspond to orientations perpendicular to the rotational plane of the windscreen wiper, the term "lower" containing the plane of the windscreen.

Figure 1:
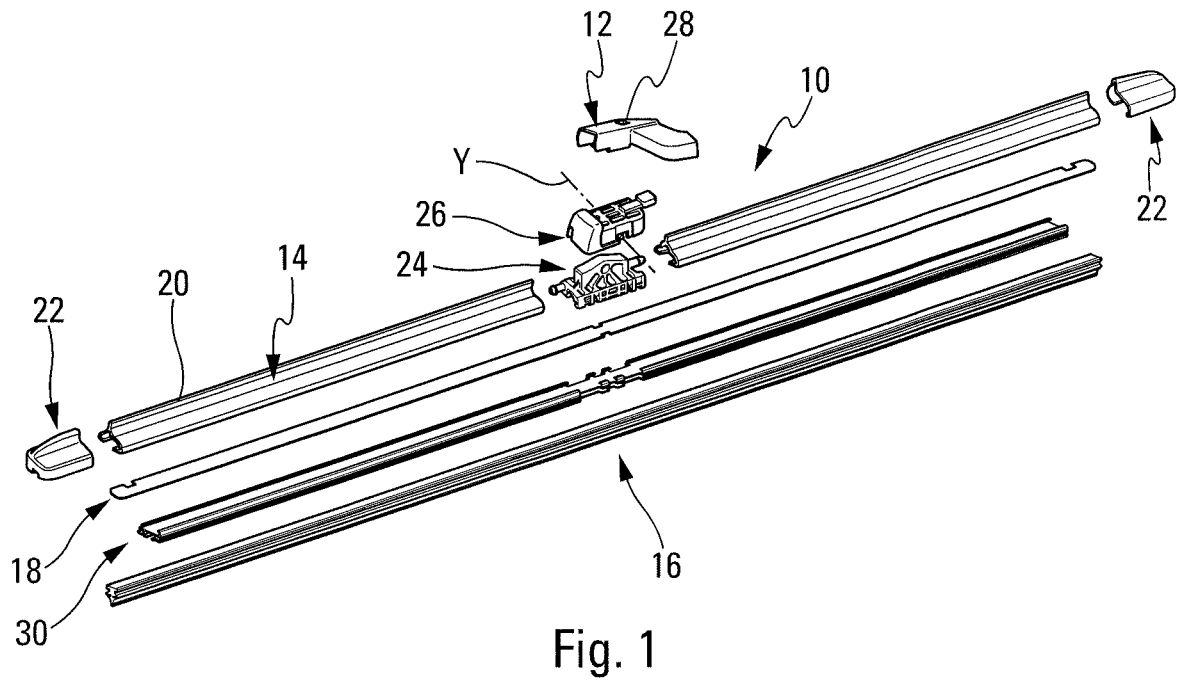
FIG. 1 is an exploded perspective view of a system for wiping according to the prior art.

Illustrated in FIG. 1 is a system according to the prior art for wiping a windscreen of a vehicle, in particular a motor vehicle. Said system comprises a longitudinal blade 10 for wiping the windscreen and a wiper carrier arm 12 which is partially shown and designed to be driven by a motor to follow an angular reciprocal movement, permitting water and potentially other undesirable elements covering the windscreen to be removed.

The wiper 10 in this case comprises a longitudinal body 14, a wiper blade 16, generally made of rubber, and at least one support element 18 so as to promote the application of the blade 16 onto the windscreen of the vehicle.

The longitudinal body 14 of the wiper 10 comprises an upper aerodynamic deflector 20 designed to improve the operation of the wiping system, the object of this deflector 20 being to improve the pressing of the wiper against the windscreen and thus the aerodynamic performance of the system.

The wiper 10 further comprises end pieces or clips 22 for hooking the wiper 16 and the support element 18 onto the longitudinal body, said clips 22 being located at each of the longitudinal ends of the longitudinal body 14.

The longitudinal body 14 of the wiper in this case is produced in two separate parts which are arranged substantially end to end and connected to one another by an intermediate connector 24. Said connector 24 is thus interposed between the two parts of the longitudinal body 14 and comprises means for fixing to these parts.

To ensure its mounting on the arm 12, the wiper 10 comprises an adapter 26 mounted on the connector 24 and permitting an articulation of the wiper 10 relative to the arm 12. The articulation of the wiper 10 relative to the arm 12 is an articulation according to a rotational movement about an axis of rotation Y perpendicular to the longitudinal axis of the wiper 10. The wiper 10 more specifically has to have at least one degree of freedom in rotation relative to the arm 12 and more particularly relative to a terminal part 28 of the arm 12, to permit the wiper 10 to follow the curvature of the windscreen.

The invention relates to a particular type of windscreen wiper, according to which the wiper further comprises a longitudinal retaining member of the blade which carries the blade and the support element and onto which the body of the wiper is hooked.

Figure 2:
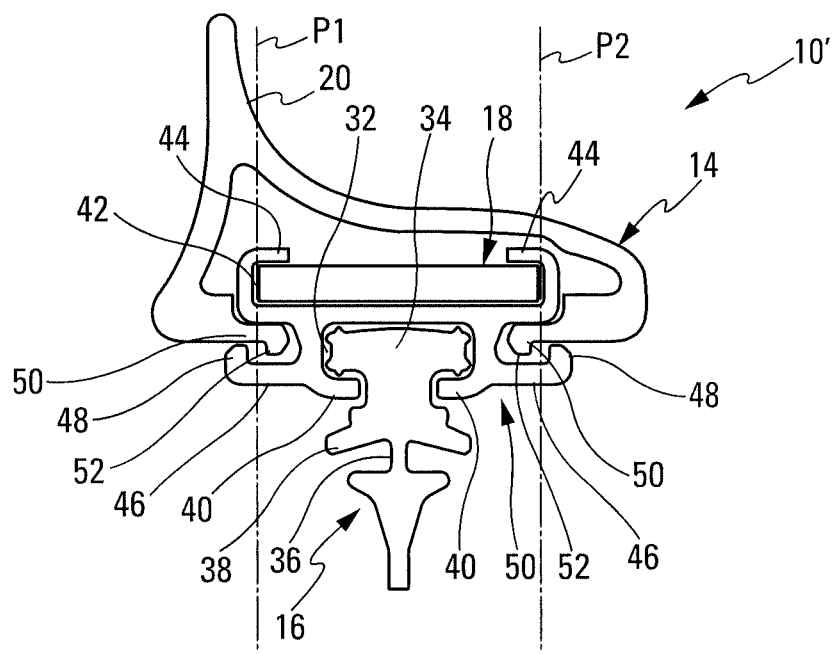
FIG. 2 is a sectional schematic view of a windscreen wiper.

FIG. 2 shows a windscreen wiper 10' of this type, the elements already described above being denoted hereinafter by the same reference numerals.

Thus the reference numerals 14, 16, 18, 20 denote respectively the longitudinal body, the wiper blade, the support element and the deflector of the wiper 10'.

The retaining member 30 of the wiper 10' comprises a first housing or lower housing 32 for receiving a longitudinal heel 34 of the blade 16. The blade 16 is, for example, of the fir tree type, well known to the person skilled in the art. Its upper end is connected by a hinge 36 and a damping member 38 to the heel 34. In the known manner, during operation, the blade 16 may come into abutment with the member 38 which dampens its return to the front or to the rear.

The housing 32 is configured to receive by longitudinal sliding the heel 34 of the blade 16. This housing 32 is delimited by two lateral walls, the lower ends thereof each being connected to a longitudinal edge 40. These edges 40 are substantially coplanar and extend toward one another. They define relative to one another a slot in which a lower narrowed part of the heel 34 which has a substantially T-shaped section may slide and is mounted.

The retaining member 30 comprises a second housing or upper housing 42 for receiving the support element 18 which thus extends above the heel 34 of the blade.

The housing 42 is configured to receive by longitudinal sliding the support element 18. Said housing 42 is delimited by two lateral walls, the upper ends thereof each being connected to a longitudinal edge 44. Said edges 44 are substantially coplanar and extend toward one another.

The retaining member 30 further comprises two lateral longitudinal hooks 46. Said hooks 46 are substantially coplanar, each hook 46 extending laterally on the side opposing the other hook. The hook 46 located at the front of the wiper thus extends to the front and the hook 46 located at the rear of the wiper extends to the rear. Each hook 46 comprises at its free end a longitudinal hooking tooth 48.

The longitudinal member 14 of the wiper comprises at its lower end means for hooking onto the retaining member 30. In the example shown, the longitudinal body 14 comprises two lateral longitudinal hooks 50 which are designed to cooperate with the hooks 46 of the retaining member.

The hooks 50 are substantially coplanar and extend toward one another to define with one another a slot in which the member 30 may slide and is mounted. The hook 50 located at the front of the wiper thus extends to the rear and the hook 46 located at the front of the wiper extends to the front. Each hook 50 comprises at its free end a longitudinal hooking tooth 52 designed to cooperate with the tooth 48 of the edge 46 corresponding to the member to limit the risk of accidental detachment of the longitudinal body relative to the retaining member.

As visible in FIG. 2, in the mounted position, each hook 50 extends above a hook 46, said two hooks 46, 50 being designed to cooperate together, being able to be considered as superposed or stacked on top of one another in a vertical plane P1 (or P2 for the other hooks) parallel to the longitudinal axis of the wiper.

The longitudinal body 14 may be mounted on the retaining member 30 in at least two ways. It is, for example, possible to position the longitudinal body and the retaining member end to end and to make them slide into one another so that their hooks 46, 50 slide on top of one another in the position shown in FIG. 2. It is also possible to engage one of the hooks 50 of the longitudinal body in the corresponding hook 46 of the retaining member 30 and to deform resiliently the longitudinal body so as to bring its other hook 50 to be engaged in the corresponding hook 46 of the member. It is also understood that this fixing is reversible here since it suffices to repeat these operations in reverse to dismantle the longitudinal body of the retaining member.

According to the invention, the wiper further comprises non-detachable means for fixing the longitudinal body to the retaining member, which prevent or which make difficult the separation of the longitudinal body from the retaining member.

FIGS. 3 to 5 show different embodiments of the invention.

FIG. 3 shows a wiper of the type shown in FIG. 2, the elements already described above being denoted hereinafter by the same reference numerals.

Relative to the wiper of FIG. 2, the wiper of FIG. 3 comprises further non-detachable means for fixing the longitudinal body 14 to the member 30, said means for fixing being obtained here by welding or adhesively bonding the hooks 46, 50 together.

At least one point or bead 54 of solder or adhesive is provided here between each hook 46 of the member 30 and the corresponding hook 50 of the longitudinal body 14, this point or this bead 54 being in this case located substantially in the aforementioned plane P1 or P2.

The adhesive used may be of the hot-melt type which has the advantage of being a quick-setting adhesive, as it hardens rapidly when cooled.

The welding may be implemented by heat using a soldering iron, for example, or by ultrasound. The welding is thus implemented by heating directly, or by means of ultrasound, the materials of the longitudinal body 14 and the member 30 so that said materials are diffused into one another or are mixed. The retaining member 30 and the longitudinal body 14 are generally produced from plastics material. The welding may be implemented by heating their materials between 200 and 300° C. and, for example, at approximately 270° C.

FIGS. 4 and 5 show variants of the wiper according to the invention which here comprises an internal conduit 56 for circulating fluid in the case of FIG. 4 and two internal conduits 56, 58 for circulating fluid in the case of FIG. 5, the fluid here being a windscreen washer fluid.

The internal conduits 56, 58 are formed in the longitudinal body 14 of the wipers and extend over substantially their entire length. They are formed on the sides of the longitudinal body 14, the two conduits of FIG. 5 being located in the same plane passing substantially through the support element 18. Each conduit 56, 58 has a shape of substantially circular section. As a variant, it could be non-circular (oval, etc.)

It is conceivable that the hooks 50 of the longitudinal body 14 are produced in a material which is different from that of the remainder of the longitudinal body, as shown by the lines 60 of FIGS. 4 and 5. This enables the hooks 50 to be produced in a material optimized for the anticipated non-detachable fixing. Said longitudinal body of the bi-material type may be produced by co-extrusion.

It is also conceivable that the hooks 46 of the member are produced in a material different from that of the remainder of the member for the same reasons. This member of the bi-material type may also be produced by co-extrusion.

Although not shown, the wipers according to the invention could be equipped with at least one heated longitudinal element, for example of the resistive type, this element extending over substantially the entire length of the wipers.

The wiper preferably comprises terminal end pieces (similar to those referenced 22 in FIG. 1) at the longitudinal ends thereof, each of said end pieces being mounted on the end parts of the longitudinal body 14 and the member 30. In a particular embodiment of the invention, a point of solder may be produced between each hook 46 and the corresponding hook 50, in the vicinity of each terminal end piece, for example by means of the method described hereinafter.

FIGS. 6 and 7 illustrate an example for implementing a step of a method for assembling a wiper according to the invention, this method comprising a plurality of steps, not shown, including:

- the heel 34 of the blade 16 is inserted by sliding into the housing 32 of the member 30,
- the support element 18 is inserted by sliding into the housing 42 of the member 30, and
- the longitudinal body 14 is hooked onto the member 30 by engaging the hooks 50 of the longitudinal body on the hooks 46 of the retaining member.

FIGS. 6 and 7 illustrate an additional step of the method, according to which the longitudinal body 14 is fixed in a non-detachable manner to the member 30, by welding in the example shown.

The welding is carried out in this case between the hooks 46, 50 as described hereinafter with reference to FIG. 3, by means of a hot soldering iron comprising two parallel heated rods 62, the free ends thereof being initially placed in contact with the lower surfaces of the hooks 46 of the member 30. Said rods 62 are then displaced upwardly in vertical translation (arrows 64) so that they pass through the hooks 46 by fusion of their material and then come into contact with the hooks 50 of the longitudinal body 14. This also causes the fusion of the material of the hooks 50 which then will be diffused into the material of the hooks 46 or mixed with this material, and provide the fixing of the hooks 46, 50 relative to one another, said hooks thus being fixed in a non-detachable manner.

The welding of the hooks 46, 50 thus causes a fusion of their materials and a deformation of the hooks which may be perforated by the passage of the rods 62 and comprise beads of material on the contour of said holes.

It should be noted that variants are naturally possible. In particular, it is also possible in an additional embodiment, not shown, that the retaining member 30 comprises substantially rectilinear transverse slots in order to increase the flexibility of the member 30, in particular in flexion. Such slots are preferably formed on the hooks 46, the longitudinal hooking teeth 48 and/or the longitudinal edges 40, at regular intervals over the entire length of the retaining member 30.

The invention claimed is:

1. A windscreen wiper for a system for wiping a window of a motor vehicle, comprising:
    a wiper blade;
    a strip-shaped, resilient, elongated support element;
    a longitudinal retaining member for the blade which comprises a first longitudinal housing for receiving a heel of the wiper blade and a second longitudinal housing for receiving said support element,
    wherein the heel of the wiper blade comprises a rectangular extension formed at an uppermost surface of the wiper blade, and is located below the elongate support element; and
    a longitudinal body which forms an aerodynamic deflector and which comprises means for hooking onto the retaining member, wherein the retaining member comprises complementary hooking means that cooperate with the means for hooking of the longitudinal body, wherein the longitudinal body is fixed in a non-detachable manner to the retaining member,
    wherein the means for hooking of the longitudinal body comprises at least one first hook having at least one first hooking tooth that extends toward the complementary hooking means of the retaining member,
    wherein the complementary hooking means of the retaining member comprises at least one second hook having at least one second hooking tooth that extends from an end of the second hook toward the first hook,
    wherein the second hooking tooth of the second hook is directly connected to and substantially perpendicular to a portion of the second hook, and
    wherein the portion is directly connected to an element that grips the wiper blade.

2. The wiper according to claim 1, wherein the means for hooking of the longitudinal body are fixed in a non-detachable manner to the complementary hooking means of the retaining member.

3. The wiper according to claim 1,
    wherein the at least one first hook comprises two first hooks that extend longitudinally,
    wherein the at least one second hook comprises two second hooks that extend longitudinally, and
    wherein the two first hooks are fixed in a non-detachable manner to the two second hooks.

4. The wiper according to claim 3, wherein the two first hooks of the means for hooking are substantially coplanar and/or the two second hooks of the complementary hooking means are substantially coplanar.

5. The wiper according to claim 3, wherein the non-detachable fixing is implemented by at least one point or bead of solder or adhesive between the longitudinal body and the retaining member.

6. The wiper according to claim 5, wherein the point or bead of solder is a point or bead of solder produced by heating or ultrasound.

7. The wiper according to claim 5, wherein each hook of the longitudinal body is fixed to the corresponding hook of the retaining member by at least one point or bead of solder or adhesive.

8. The wiper according to claim 5, further comprising, at each of its longitudinal ends, a terminal end piece which is mounted on end parts of the longitudinal body and/or the retaining member.

9. The wiper according to claim 8, wherein at least one point or bead of solder or adhesive is located in the vicinity of each terminal end piece.

10. The wiper according to claim 1, wherein said first and second housings are configured to receive by longitudinal sliding the heel of the blade and the support element, respectively.

11. The wiper according to claim 1, wherein the support element extends above the heel of the blade.

12. The wiper according to claim 1, further comprising at least one internal conduit for circulating fluid, such as a windscreen washer fluid.

13. A system for wiping a window of a motor vehicle, comprising the windscreen wiper according to claim 1.

14. The wiper according to claim 1, wherein the heel of the wiper blade is separate from the elongate support element.

15. A method for assembling a windscreen wiper for a system for wiping a window of a motor vehicle, said wiper comprising:
    a wiper blade,
    a strip-shaped, resilient, elongated support element,
    a longitudinal retaining member for the blade which comprises a first longitudinal housing for receiving a heel of the blade and a second longitudinal housing for receiving said support element, wherein the heel of the wiper blade comprises a rectangular extension formed at an uppermost surface of the wiper blade, and is located below the elongate support element, and
a longitudinal body which forms an aerodynamic deflector and which comprises means for hooking onto the retaining member,
the method comprising:
 inserting by sliding the heel of the blade and the support element respectively into the first and second housings of the retaining member;
 hooking the longitudinal body onto the retaining member, wherein the retaining member comprises complementary hooking means that cooperate with the means for hooking of the longitudinal body; and
 fixing in a non-detachable manner the longitudinal body to the retaining member by adhesive bonding or welding, wherein the means for hooking of the longitudinal body comprises at least one first hook having at least one first hooking tooth that extends toward the complementary hooking means of the retaining member,
wherein the complementary hooking means of the retaining member comprises at least one second hook having at least one second hooking tooth that extends from an end of the second hook toward the first hook,
wherein the method further comprises engaging the first hooking tooth of the first hook with a second hooking tooth of the second hook,
wherein the second hooking tooth of the second hook is directly connected to and substantially perpendicular to a portion of the second hook, and
wherein the portion is directly connected to an element that grips the wiper blade.

\* \* \* \* \*